(12) United States Patent
Castonguay et al.

(10) Patent No.: US 10,886,636 B2
(45) Date of Patent: Jan. 5, 2021

(54) CONNECTORS FOR FLEXIBLE BUSBAR AND METHODS OF CONNECTING

(71) Applicant: HUBBELL INCORPORATED, Shelton, CT (US)

(72) Inventors: Kevin Normand Castonguay, Weare, NH (US); Logan Michael Trombley, Manchester, NH (US); Armand Thomas Montminy, Hooksett, NH (US); Richard E. Robicheau, Litchfield, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/455,203

(22) Filed: Jun. 27, 2019

(65) Prior Publication Data

US 2019/0319371 A1    Oct. 17, 2019

Related U.S. Application Data

(63) Continuation of application No. 15/075,510, filed on Mar. 21, 2016, now Pat. No. 10,361,491.

(60) Provisional application No. 62/137,130, filed on Mar. 23, 2015.

(51) Int. Cl.
*H01R 4/18* (2006.01)
*H01R 43/048* (2006.01)
*H01R 11/12* (2006.01)

(52) U.S. Cl.
CPC ........... *H01R 4/182* (2013.01); *H01R 43/048* (2013.01); *H01R 11/12* (2013.01)

(58) Field of Classification Search
CPC ....... H01R 4/182–4/188; H01R 43/048; H01R 11/12; H01R 4/00; H01R 4/18; H01R 4/20; H01R 4/203; H01R 4/206; H01R 12/69; H01R 12/68; H05K 3/326
USPC ......... 174/149 B, 84 C, 138 R, 72 B, 40 CC; 439/877–882, 422, 421, 492, 423, 424, 439/430, 442
See application file for complete search history.

(56) References Cited

U.S. PATENT DOCUMENTS

| | | |
|---|---|---|
| 3,259,873 A | 7/1966 | Parkinson |
| 3,437,985 A | 4/1969 | Jones |
| 3,461,221 A | 8/1969 | Herb |
| 3,825,881 A | 7/1974 | Wigby |

(Continued)

FOREIGN PATENT DOCUMENTS

CN    102842832    12/2012

OTHER PUBLICATIONS

Burndy Catalog Grounding Products, Type YG-B, Bus Bar Connector, Oct. 2014.

(Continued)

*Primary Examiner* — Angel R Estrada
(74) *Attorney, Agent, or Firm* — Ohlandt, Greeley, Ruggiero & Perle, LLP (57) ABSTRACT

A connector for a flexible busbar is provided. The connector includes a jaw and a relief. The jaw has a first member and a second member both depending from a support member and spaced from one another by a distance. The distance is larger than a thickness of the flexible busbar. The relief is defined on first member and/or second member. The jaw is deformably compressible onto the flexible busbar upon application of a deformation force on the first and second members so that the flexible busbar conforms to the at least one relief to form an electrical and mechanical connection.

19 Claims, 10 Drawing Sheets

(56) References Cited

U.S. PATENT DOCUMENTS

| | | |
|---|---|---|
| 3,881,796 A | 5/1975 | Saunders |
| 3,932,018 A | 1/1976 | Parsons |
| 4,241,498 A | 12/1980 | Brandeau |
| 4,522,460 A | 6/1985 | Beck |
| 4,804,344 A | 2/1989 | Salvador |
| 4,867,700 A | 9/1989 | Kreinberg |
| 4,884,976 A | 12/1989 | Franks |
| 4,915,650 A | 4/1990 | Daly |
| 5,036,164 A | 7/1991 | Schrader |
| 5,200,576 A | 4/1993 | Schrader |
| 5,219,303 A | 6/1993 | Daly |
| 5,649,445 A | 7/1997 | Lavoie |
| 5,997,368 A | 12/1999 | Mello |
| 6,232,555 B1 | 5/2001 | Besler |
| 6,305,968 B1 | 10/2001 | Hio |
| 6,341,980 B1 | 1/2002 | Hio |
| 6,467,164 B2 | 10/2002 | Masahiko |
| 6,649,840 B2 | 11/2003 | Triantopoulos |
| 6,989,491 B2 | 1/2006 | Triantopoulos |
| 7,173,187 B2 | 2/2007 | Triantopoulos |
| 7,988,464 B2 | 8/2011 | Kossak |
| 8,696,816 B2 | 4/2014 | Tokuda |
| 2014/0073204 A1 | 3/2014 | Ramey |

OTHER PUBLICATIONS

Burndy Catalog Grounding Products, Type YGIB, Groundlink Connector, Oct. 2014.

International Preliminary Report on Patentability dated Sep. 26, 2017 from corresponding International Application No. PCT/US2016/023386.

International Search Report dated Jun. 9, 2016 from corresponding International Application No. PCT/US2016/023386.

International Written Opinion dated Jun. 9, 2016 from corresponding International Application No. PCT/US2016/023386.

CONNECTORS FOR FLEXIBLE BUSBAR AND METHODS OF CONNECTING

CROSS REFERENCE TO RELATED APPLICATIONS

This application is a continuation of U.S. application Ser. No. 15/075,510 filed Mar. 21, 2016, now pending, which claims the benefit of U.S. Provisional Application Ser. No. 62/137,130 filed Mar. 23, 2015, the entire contents of both of which are incorporated by reference.

BACKGROUND

1. Field of the Disclosure

The present disclosure is related to connectors for flexible busbars. More particularly, the present disclosure is related to deformably compressible connectors for flexible busbars and methods of connecting.

2. Description of Related Art

Busbars are metal conductors that are used in electrical systems such as, but not limited to, switch gear, panel boards, distribution boards, and the like. When the busbars are flexible busbars, they are typically formed of a number of conductive layers. Further, when a busbar is flexible, it can be used for power distribution in a manner analogous to a conventional round conductor.

The busbars are terminated or secured using hardware. Installation can be time consuming and cumbersome for the installer for several reasons. During installation a hole is often made in the busbar using, for example, a drill or a hole punch. Next, the busbar is fastened to the intended fixture using hardware. Finally, the hardware is then tightened such that the busbar is able to adequately conduct electricity while simultaneously resisting a certain pull out force and remaining securely attached.

Flexible busbars are often installed into tight enclosures. Because of the complexity and numerous steps required for installing busbars, sufficient clearance in the installation area is required so that the installer can operate the tools necessary for the installation.

Accordingly, there is a need for connectors for flexible busbars that overcome, alleviate and/or mitigate one or more of the aforementioned or other defects and deficiencies of prior art busbar connectors.

SUMMARY

A connector for a flexible busbar is provided. The connector includes a jaw and a relief. The jaw has a first member and a second member both depending from a support member and spaced from one another by a distance. The distance is larger than a thickness of the flexible busbar. The relief is defined on first member and/or second member. The jaw is deformably compressed onto the flexible busbar upon application of a deformation force on the first and second members so that the flexible busbar deforms, thus conforming to the at least one relief to form an electrical and mechanical connection.

In embodiments alone or in combination with one or more of the aft mentioned embodiments, the jaw is made of a material that is harder than a material of the flexible busbar.

In embodiments alone or in combination with one or more of the afore or aft mentioned embodiments, the jaw has a length along a first axis and a width along a second axis.

In embodiments alone or in combination with one or more of the afore or aft mentioned embodiments, the width of the first and/or second member is from 35% to 140% of a width of the flexible busbar.

In embodiments alone or in combination with one or more of the afore or aft mentioned embodiments, the relief is disposed along the first axis or the second axis.

In embodiments alone or in combination with one or more of the afore or aft mentioned embodiments, the relief is disposed at an intersection of the first member and/or second member and the support member so that the relief functions as a weakened area for deformable compression of the jaw.

In embodiments alone or in combination with one or more of the afore or aft mentioned embodiments, the connector also includes a lug depending from the support member along the first axis.

In embodiments alone or in combination with one or more of the afore or aft mentioned embodiments, the relief comprises two reliefs on the first member and three reliefs on the second member. The reliefs on the first and second members being axially offset, along the first axis, from one another.

In embodiments alone or in combination with one or more of the afore or aft mentioned embodiments, the connector further includes a guide on an outer surface of the first member and/or the second member. The guide is configured for receiving and collocating an indenter die to ensure the desired deformable compression of the jaw onto the flexible busbar.

In embodiments alone or in combination with one or more of the afore or aft mentioned embodiments, the guide is disposed along the first axis.

A busbar assembly is also provided that includes a flexible busbar, a jaw, and a relief. The flexible busbar includes a plurality of electrically conducting layers stacked upon one another to provide a thickness. The jaw has a first member and a second member both depending from a support member and spaced from one another by a distance. The distance, before deformable compression, is larger than the thickness of the flexible busbar. The relief is on the first member and/or second member. The jaw is deformably compressed onto the flexible busbar upon application of a deformation force on the first and second members so that the flexible busbar conforms to the at least one relief to form an electrical and mechanical connection.

In embodiments alone or in combination with one or more of the afore or aft mentioned embodiments, the assembly further includes insulation disposed on at least a portion of the flexible busbar.

In embodiments alone or in combination with one or more of the afore or aft mentioned embodiments, the jaw is made of a material that is harder than a material of the flexible busbar.

In embodiments alone or in combination with one or more of the afore or aft mentioned embodiments, the jaw is an extruded member.

In embodiments alone or in combination with one or more of the afore or aft mentioned embodiments, the jaw has a length along a first axis and a width along a second axis.

In embodiments alone or in combination with one or more of the afore or aft mentioned embodiments, the width of the first and/or second member is from 35% to 140% of a width of the flexible bus bar.

In embodiments alone or in combination with one or more of the afore or aft mentioned embodiments, the relief is disposed at an intersection of the first member and/or second member and the support member so that the relief functions as a weakened area for deformable compression of the jaw.

A method for connecting connector and a flexible busbar is provided that includes inserting the flexible busbar having a plurality of stacked conducting layers between first and second members of the connector; and applying a deforming force onto the connector sufficient to deformably compress the first and second members onto the flexible busbar so that the flexible busbar deforms and conforms to at least one relief in the first member and/or second member to form an electrical and mechanical connection.

In embodiments alone or in combination with one or more of the afore or aft mentioned embodiments, the plurality of stacked conducting layers slide with respect to one another during conformance of the flexible busbar to the at least one relief.

The above-described and other features and advantages of the present disclosure will be appreciated and understood by those skilled in the art from the following detailed description, drawings, and appended claims.

DETAILED DESCRIPTION

Referring to the drawings and in particular to FIGS. 1 through 5, an exemplary embodiment of a deformably compressible connector according to the present disclosure is shown and is generally referred to by reference numeral 10. Advantageously, connector 10 is configured to be deformably compressed onto and, thus, secured onto a flexible busbar 12 in an electrically conductive and mechanically robust manner.

Connector 10 includes a lug 14 and a deformably compressible jaw 16 having a first member 18 and a second member 20 both depending from a support member 22. Jaw 16 is configured to be compressed by application of a deformation force ($F_d$) so that first and second members 18, 20 are deformably compressed onto flexible busbar 12 with the flexible busbar mechanically and electrically connected to connector 10 in a manner resistant to pullout forces ($F_p$). As used herein, the pullout force ($F_p$) is defined as a force along first axis 24 (FIGS. 3 and 4) and/or second axis 26 (FIG. 3) necessary to disengage or to dislodge busbar 12 from connector 10.

Connector 10 is configured so that, during compression of jaw 16, the jaw deformably compresses at least one of first member 18, second member 20, and support member 22.

Figure 3:
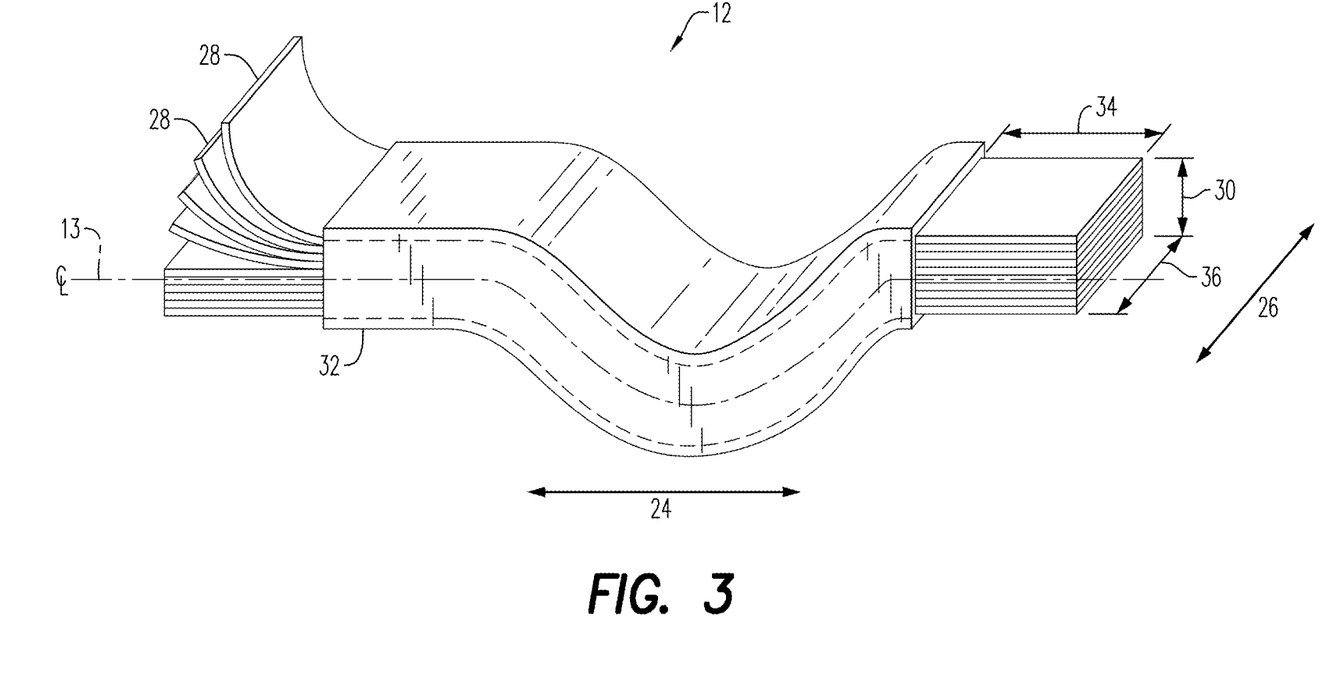
FIG. 3 is side view of a flexible busbar for use with the connector of FIG. 1.

Busbar 12 includes a plurality of electrically conducting layers 28 stacked upon one another to provide a desired thickness 30 and, when desired, an insulation 32 along first axis 24. It is contemplated by the present disclosure for the individual layers 28 of busbar 12 can have a common thickness or for the layers to have different thicknesses. By way of non-limiting example, thickness 30 can be between 1 and 100 millimeters (mm), preferably between 5 and 55 mm, with between 10 and 30 mm being most preferred, and any subranges therebetween. The number of individual layers 28 of busbar 12 can also vary, from a single layer to thirty layers.

Further, busbar 12 has a centerline CL along axis 24. Owing to its novel structure, the connectors according to the present disclosure deform busbar 12 through and including centerline CL. Stated another way, all of the layers 28, including the centermost layer, deform.

When insulation 32 is present, the insulation is removed at ends of busbar 12 to provide exposed ends of at least a length 34 along first axis 24 and a width 36 along second axis 26 that allows for mechanical and electrical connection with connector 10. Additionally, insulation 32, when present, can at least assist at maintaining layers 28 in stacked alignment.

Figure 1:
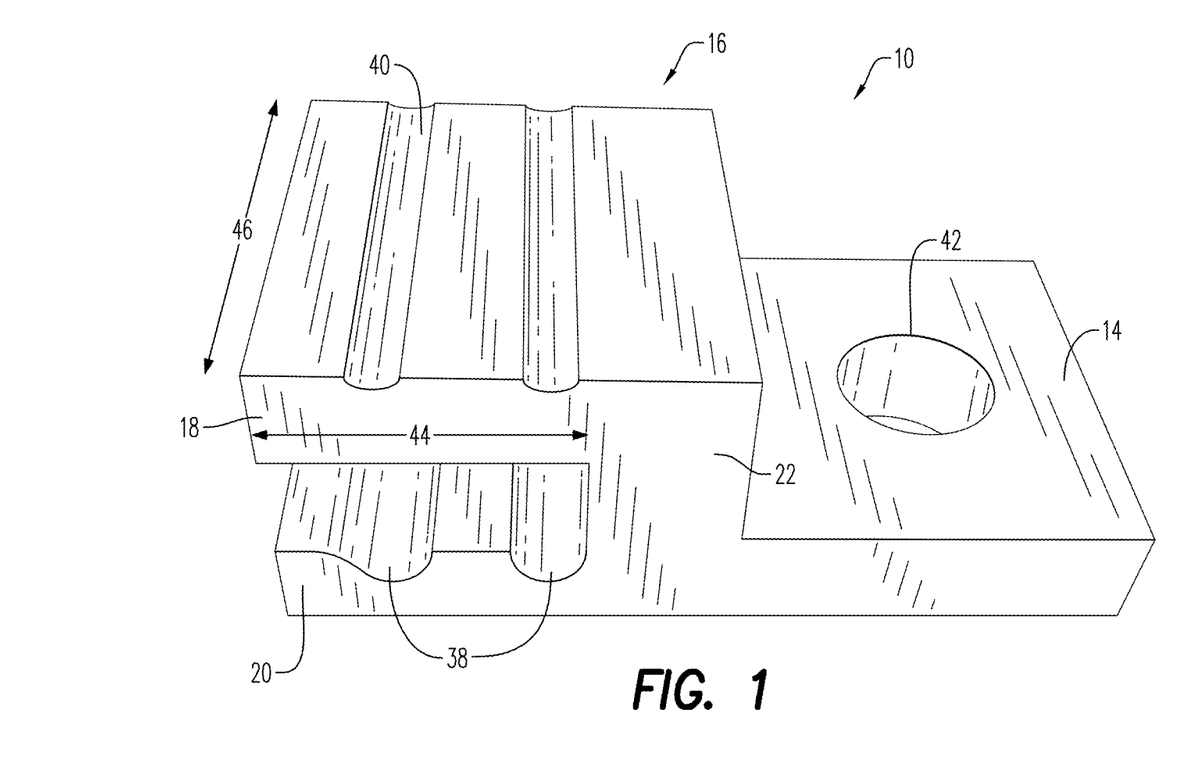
FIG. 1 is a top perspective view of an exemplary embodiment of a deformably compressible connector according to the present disclosure.
Figure 2:
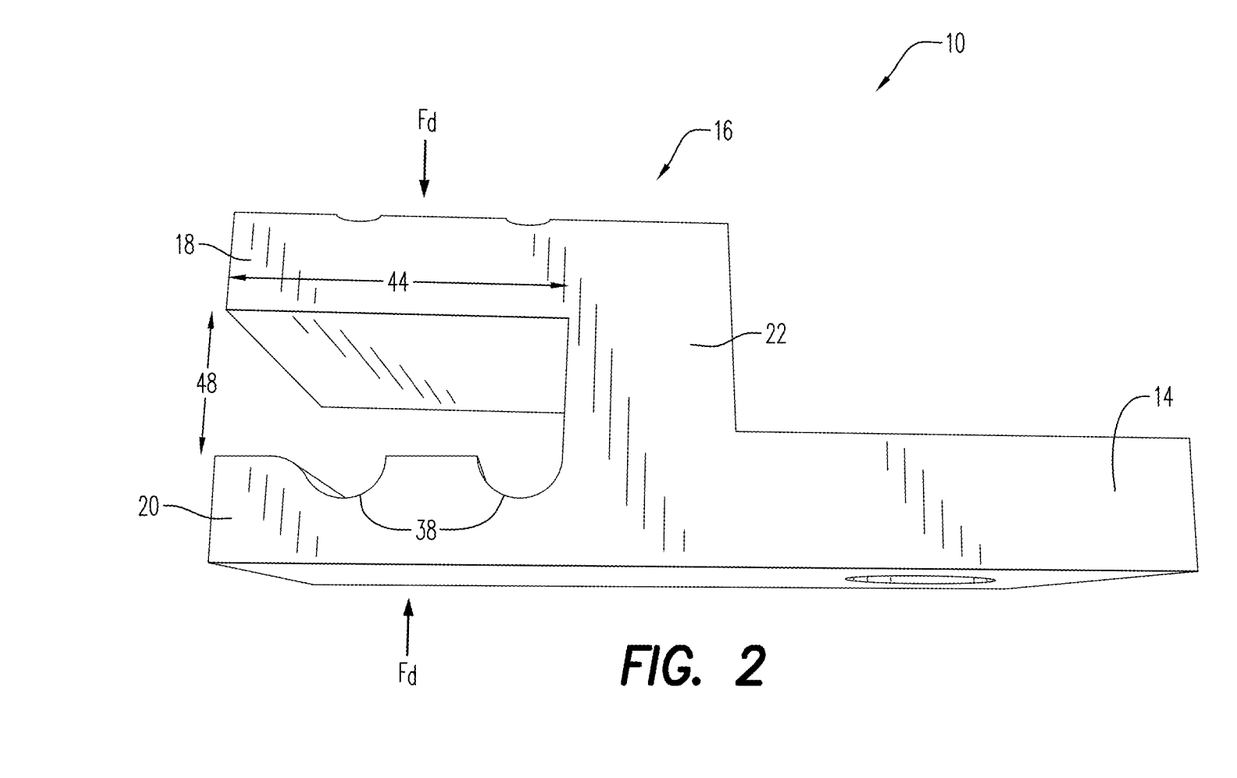
FIG. 2 is a side perspective view of the connector of FIG. 1.

Connector 10 includes one or more reliefs 38 (two shown) defined within jaw 16 on first and/or second member 18, 20. In the illustrated embodiment, reliefs 38 are illustrated on second member 20. Of course, it is contemplated by the present disclosure for reliefs 38 to be only on first member 18, only on second member 20, or on both the first and second members. Additionally, reliefs 38 are illustrated in the exemplary embodiment as being along second axis 26. Of course, it is contemplated by the present disclosure for reliefs 38 to be along first axis 24, along second axis 26, along both first and second axes, angled with respect to either the first or second axis, and any combinations thereof.

Moreover, it should be recognized that reliefs 38 are illustrated as continuous across the entire extent of second member 20. However, it is contemplated by the present disclosure for reliefs 38 to be continuous, discontinuous, or any combinations thereof.

Relief 38 can have any desired cross-sectional shape such as, but not limited to, polygonal or curved. Additionally, relief 38 can be concave, convex, any combinations thereof. In the illustrated embodiment, relief 38 has a semi-circular concave cross section.

Connector 10 is further configured so that at least one of relief 38 is located at the intersection of second member 20 and support member 22. In this manner, relief 38 acts as a weakened area for deformable compression of jaw 16.

Advantageously, it has been determined by the present disclosure that providing busbar 12 with individual layers 28 allows the layers to deform and slide along at least first axis 24 with respected to one another when connector 10 is deformably compressed onto the busbar. Stated another way, it has been determined that flexible busbar 12, due to layers 28, is particularly suited for deformation within connector 10.

Moreover, and without wishing to be bound by any particular theory, it is believed that connector 10 should be made of a material that is harder or less malleable than the material of busbar 12, which is believed to allow layers 28 to slide over one another and allow the busbar to deform and flow into reliefs 38. Simply stated, connector 10 is configured to deformably compress at jaw 16—namely at first member 18, second member 20, support member 22, and any combinations thereof—so that busbar 12 conforms to the peaks and valleys formed by reliefs 38. Certain embodiments like connector 610, shown in FIGS. 4 and 14 also have an indenter which concentrate the deformation force (not shown) on the flexible busbar (not shown) such that the flexible busbar deforms and conforms to reliefs vertically aligned therewith.

Connector 10 can, in some embodiments, also include one or more guides 40 (two shown) formed by a relief, channel, trough, or indentation on an outer surface of first member 18. In the illustrated embodiment, guides 40 are illustrated on first member 18. Of course, it is contemplated by the present disclosure for guides 40 to be only on second member 20, only on first member 18, or on both the first and second members. As will be described in more detail below, guides 40 are configured for receiving and collocating an indenter die to ensure the desired deformable compression of jaw 16 onto busbar 12.

Additionally, guides 40 are illustrated in the exemplary embodiment as being along second axis 26—and/or along the same axis as guides 38. Of course, it is contemplated by the present disclosure for guides 40 to be along first axis 24, along second axis 26, along both the first and second axes, angled with respect to either of the first or second axes, and any combinations thereof. Further, it is contemplated by the present disclosure for guides 40 to be parallel to reliefs 38, perpendicular to the reliefs, angled with respect to the reliefs, and any combinations thereof.

Moreover, it should be recognized that guides 40 are illustrated as continuous across the entire extent of first member 18. However, it is contemplated by the present disclosure for guides 40 to be continuous, discontinuous, or any combinations thereof. Guides 40 can have any desired cross-sectional shape such as, but not limited to, polygonal or curved.

Lug 14 can, in some embodiments include a bore 42 therethrough for securing connector 10 with conventional fastening hardware to a circuit or other component. In this manner, connector 10, after deformable compression of jaw 16 and deformation of flexible busbar 12, can be used to terminate the busbar and pass electrical current from the flexible busbar to a desired mounting surface connected to lug 14. Bore 42 has, optionally, a thread, a countersink, and/or a counterbore.

However, owing to its unique design, connector 10 according to the present disclosure deforms flexible busbar 12 onto which the connector is connected. In certain preferred embodiments, connector 10 according to the present disclosure deforms flexible busbar 12 through a centerline CL of the flexible busbar, and onto which the connector is connected Advantageously and unlike prior art conductors, flexible busbar 12 does not expand outwardly when deformed, thus maintaining its original width prior to deformation. Rather, layers 28 deform and slide over one another along first axis 24 so as to conform to reliefs 38. Such configuration unexpectedly yields an improved contact between connector 10 and busbar 12. Consequently, increased pullout values are achieved by connector 10 as compared to prior art connectors.

Connector 10 has a length 44 along first axis 24 and a width 46 along second axis 26. In some embodiments, width 46 of connector 10 is from 35% to 140% of width 36, preferably from 75% to 105%, and with 80% to 100% being most preferred, and any subranges therebetween. In embodiments where width 46 is less than 75%, first and second members 18, 20 can have a thickness that is increased from 5% to 20% to accommodate for less conducting material of present in busbar 12 within jaw 16, as compared to larger widths.

Connector 10 has a distance 48 between first and second members 18, 20, which depend on thickness 30 of flexible busbar 12. Accordingly, before compression, distance 48 between first and second members 18, 20 should be larger than thickness 30 by no more than 30%, with no more than 20% being preferred, and no more than 10% being most preferred.

Connector 10 is, in some embodiments, an extruded member that allows for rapid manufacturing and efficient use of materials contributing to less wasted material. Once formed as an extrusion, connector 10 can be trimmed or cut from the extrusion to width 46. Of course, it is contemplated by the present disclosure for connector 10 to be made by any desired method such as, but not limited to, molding, machining, additive manufacturing, stamping and welding, and others. In some preferred embodiments, connector 10 is formed as a single piece construction.

Connector 10 is made of any material having sufficient strength, hardness, malleability, and electrical conductivity for the desired application. In some embodiments, connector 10 is made a metal such as, but not limited to steel, iron, aluminum, copper, silver, gold, and alloys thereof. Additionally, it is contemplated by the present disclosure for connector 10 to be made of any desired material and to further include a coating (not shown) on at least the surfaces that contact busbar 12.

Although connector 10 is described herein by way of example in use with flexible busbar 12 having layers 28, it is also contemplated by the present disclosure that the connector 10 finds equal use with busbars having only a single layer of conductor. It should also be understood that connector 10 can also be deformably compressed onto busbars, flexible or otherwise, having ends that are non-rectangular in shape.

Three samples of the connector were tested, each having a sample hardness of Rockwell F 82 max. Each was tested to determine a pullout value after the jaws were deformably compressed onto a flexible busbar. Results are summarized in Table 1 below. Ratings were given to each embodiment based on whether the particular connecter failed or passed, with connectors passing being further rated as good, better, or best. Each was used in conjunction with a differently sized flexible busbar 12, which was annealed to a 38 F scale hardness.

TABLE 1

Figure 4:
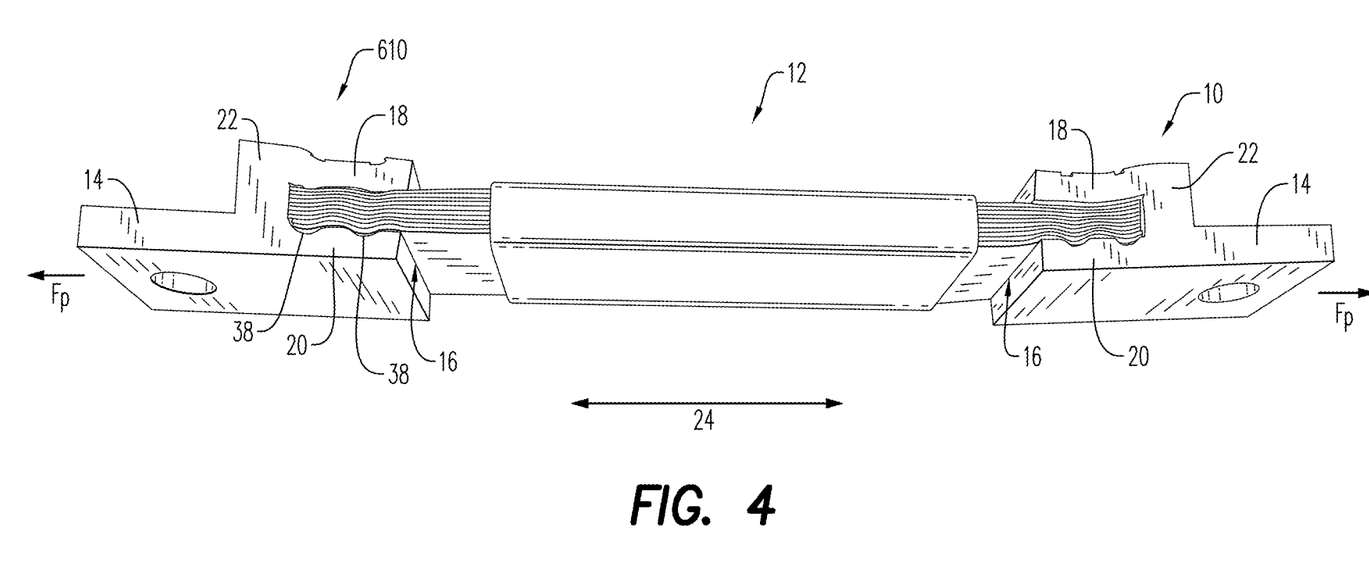
FIG. 4 is a side view of the connector of FIG. 1 after connection to the flexible busbar of FIG. 2.
Figure 5:
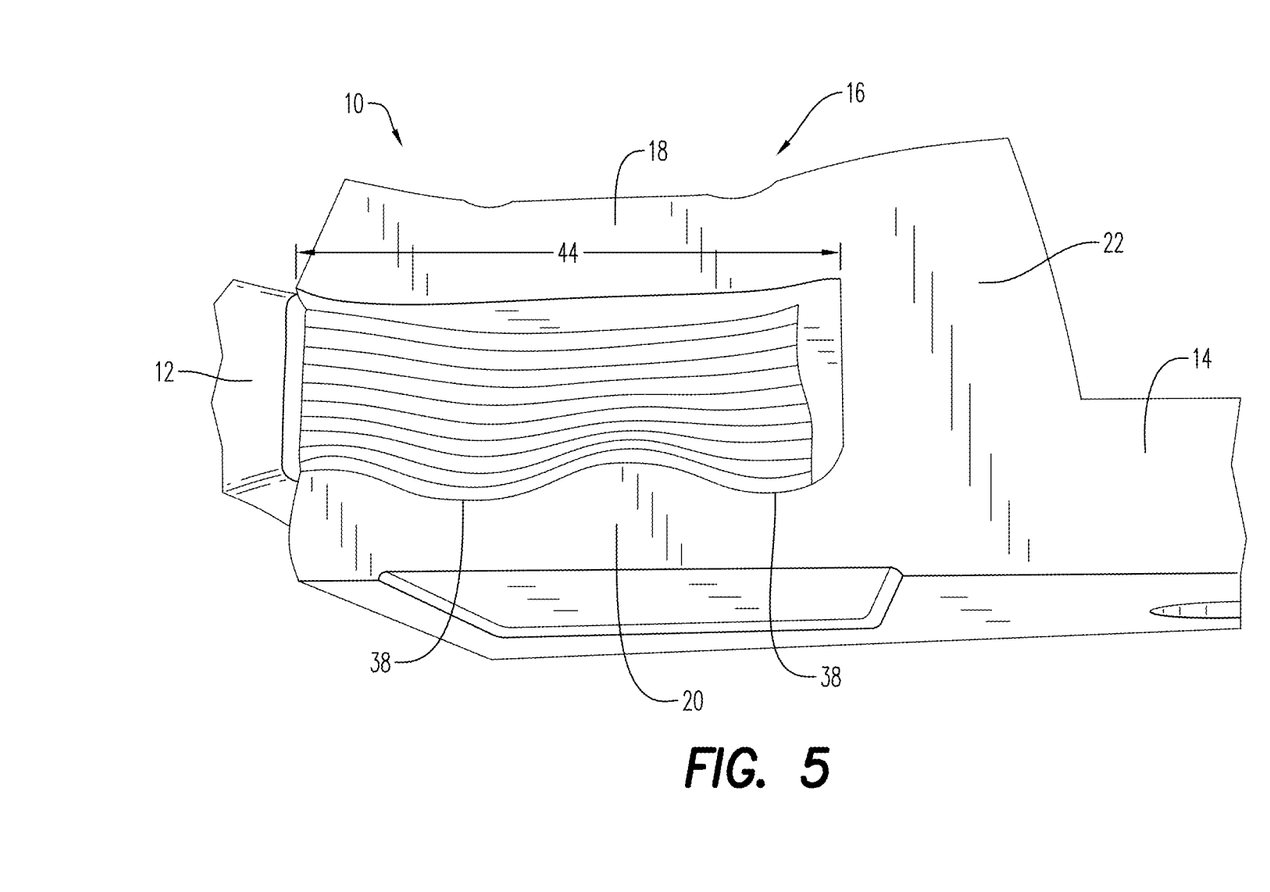
FIG. 5 is an enlarged view of the assembly of FIG. 4.
Figure 13:
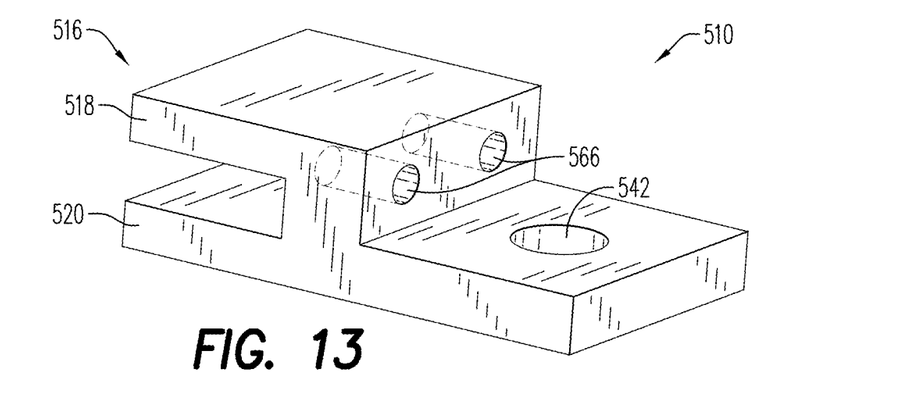

| Sample # | Embodiment | Flexibus Size | kcmil Equivalent | UL LBF Requirement | Pullout Value |
|---|---|---|---|---|---|
| 1 | See, e.g. FIG. 13 | 1 × 40 × 10 | 789.41 | for 700-2000 kcmil it is 1000 lbf | Pass - Good |
| 2 | See connector 10, e.g., right hand side of FIG. 4 with bottom relief | | | | Pass - Better |

TABLE 1-continued

Figure 14:
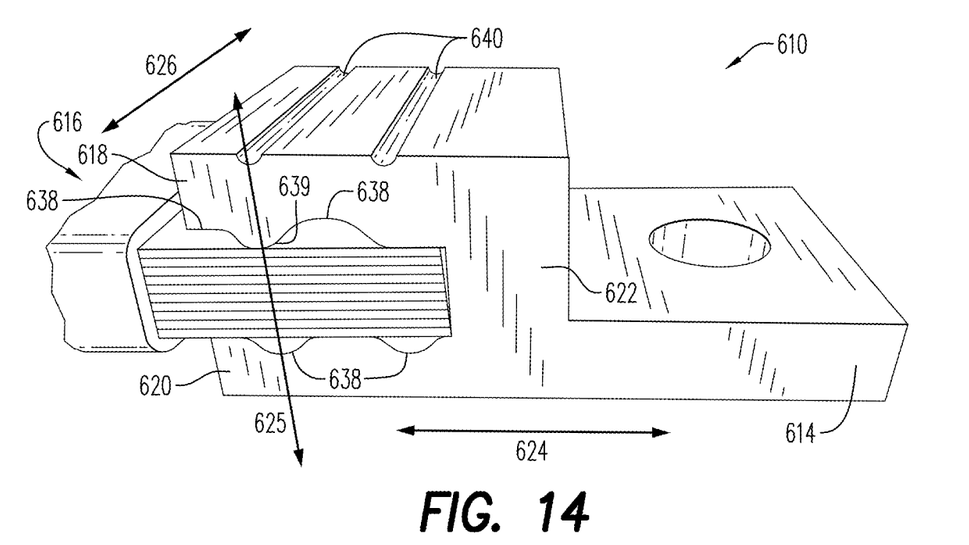

| Sample # | Embodiment | Flexibus Size | kcmil Equivalent | UL LBF Requirement | Pullout Value |
|---|---|---|---|---|---|
| 3 | See connector 610, e.g. FIG. 14 See connector 610, e.g., left hand side of FIG. 4 with bottom relief and top indenter | | | | Pass - Best |

Advantageously, the assembly of flexible busbar 12 and one or more connectors 10 and 610 (described below), as shown in the figures, provide a simple structure that is resistant to the pullout forces ($F_p$) in an easily repeatable manner.

Figure 6:
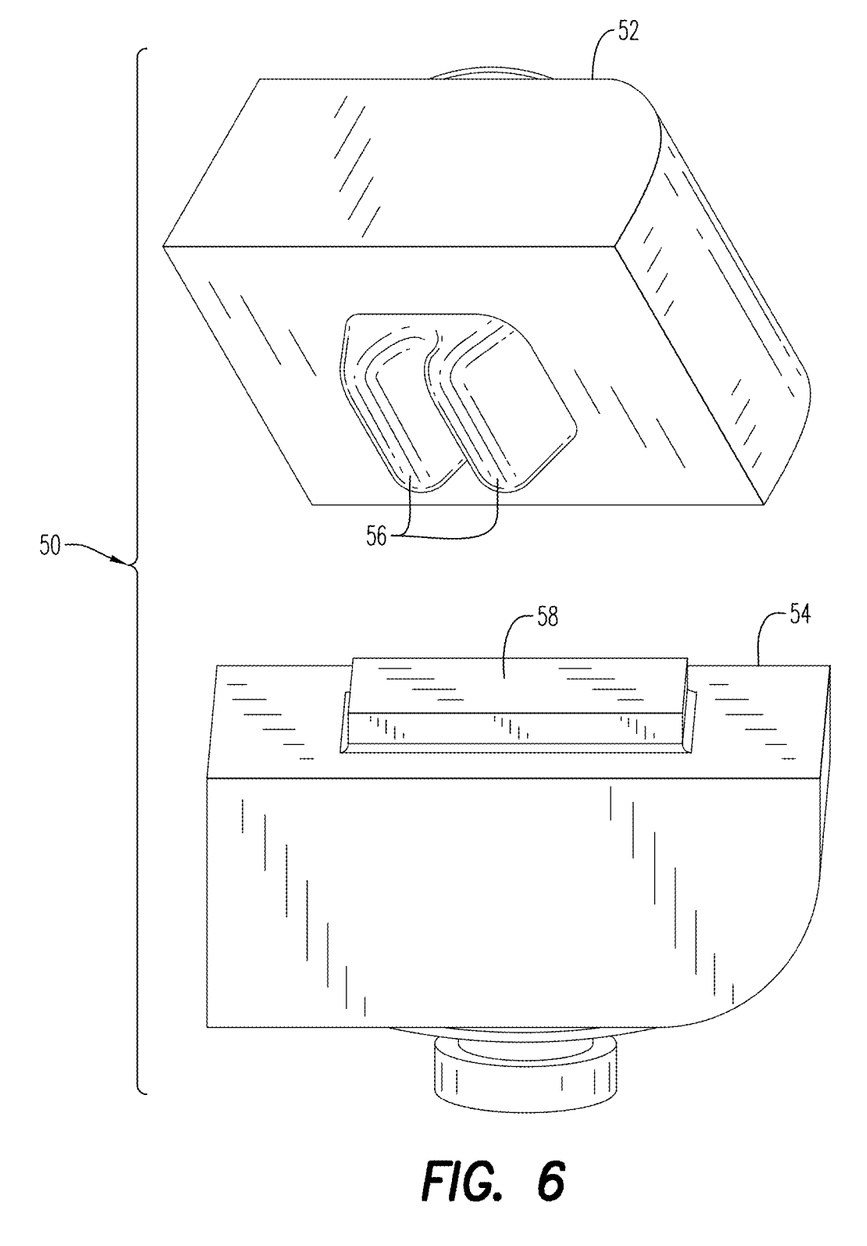
FIG. 6 is a perspective view of an exemplary embodiment of a die set according to the present disclosure for use with the connector of FIG. 1.
Figure 7:
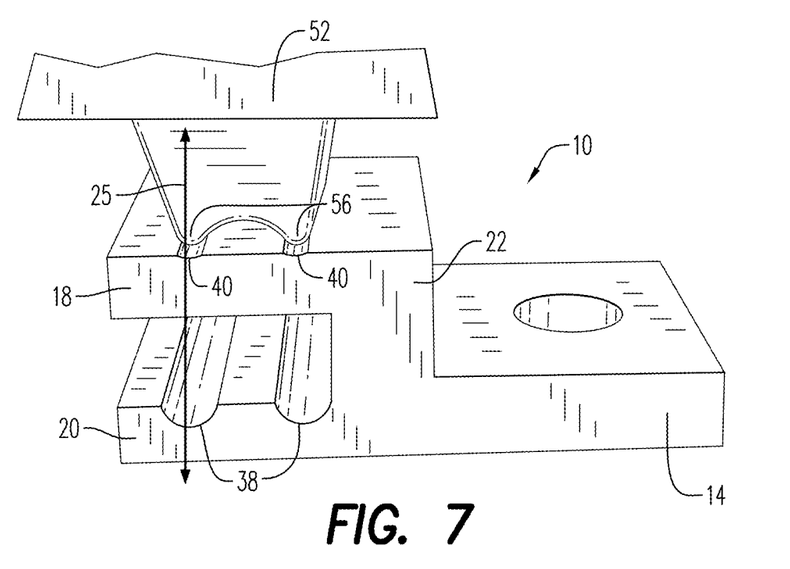
FIG. 7 is a side view of the top die of FIG. 6 in use with the connector of FIG. 1.
Figure 8:
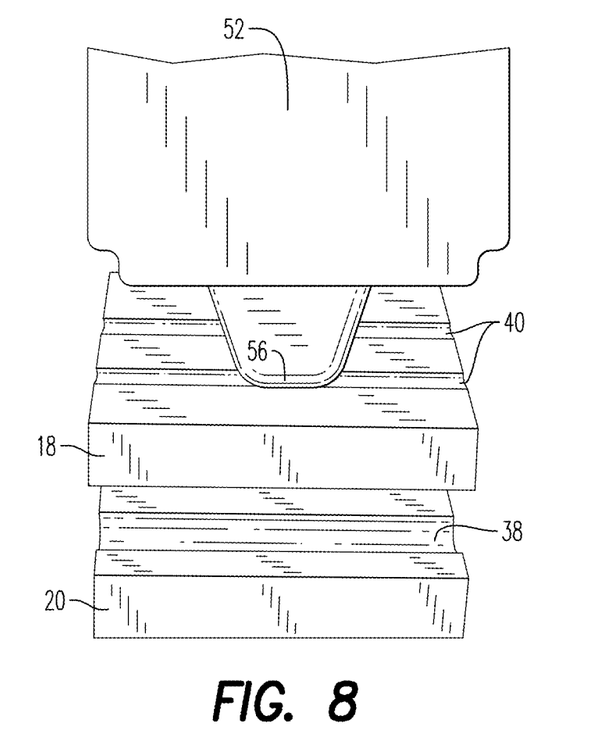
FIG. 8 is a front view of the top die of FIG. 6 in use with the connector of FIG. 1.

Turning now to FIGS. 6-8, connector 10 is shown in use with an indentor die set 50. Die set 50 includes a first die 52 and a second die 54. Here, first die 52 is configured for contact with first member 18, while second die 54 is configured for contact with second member 20.

First die 52 has one or more indenting protrusions 56 (two shown), which are configured for mating with guides 40 on an outer surface of first member 18 of jaw 16, while second die 54 has a flat surface 58 for mating with an outer surface of second member 20 of the jaw. The mating of guides 40 and protrusions 56 are configured to ensure the desired deformation from die set 50 is applied at a desired location of jaw 16 so as to deform busbar 12 by deformably compressing connector 10 thereon. In preferred embodiments, guides 40 are in vertical alignment with reliefs 38 along third axis 25. Protrusions 56 of indenting die 52 thus align with guides 40 to concentrate a deformation force at reliefs 38 in second member 20. In embodiments where reliefs are also present in first member 18 such as shown in FIG. 14, the reliefs in first member 18 are vertically offset with respect to the reliefs in second member 20 and spaced apart by an indenter in first member 18 that vertically aligns with the reliefs in second member 20 and guides 40.

In the illustrated embodiment, protrusions 56 are illustrated on first die 52 and along second axis 26 so as to mate with guides 40, which are positioned on first member 18 and along second axis 26. Of course, it is contemplated by the present disclosure for protrusions 56 to be only on second die 54, only on first die 52, or on both the first and second die, as well as along first axis 24, along second axis 26, along both the first and second axes, angled with respect to either the first or second axis, and any combinations thereof—or as needed to conform to the location and position and size of guides 40 on first member 18 and/or second member 20.

It should be recognized that connector 10 is described above by way of example only. Alternate exemplary embodiments of the connector according to the present disclosure are shown in FIGS. 9-15 and having features performing similar and/or analogous functions number in multiples of one hundred.

Figure 9:
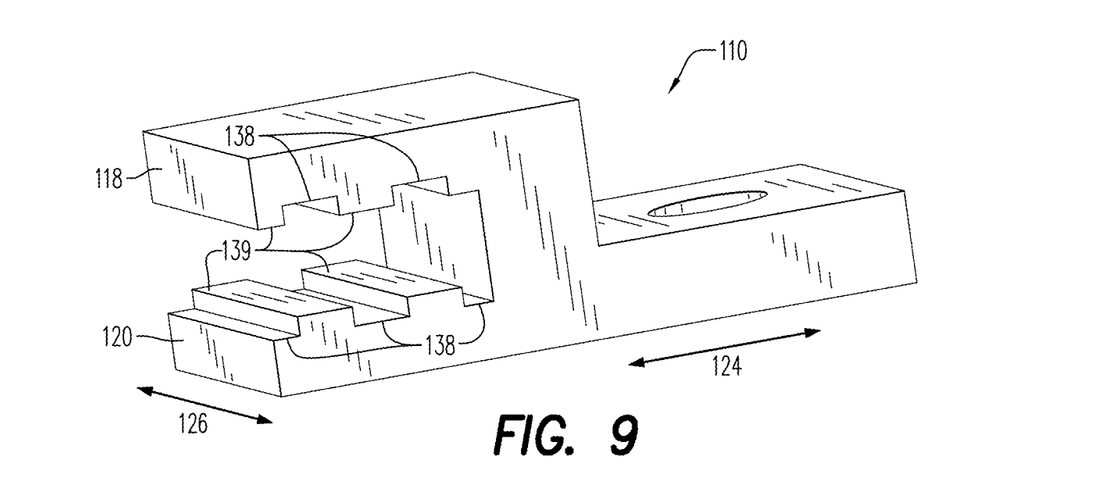
FIGS. 9-15 are perspective views of alternate exemplary embodiments of connectors according to the present disclosure.

In the embodiment of connector 110 illustrated in FIG. 9, the connector has one or more reliefs 138 on both first and second members 118, 120, extending along second axis 126, and having a rectangular cross section. Advantageously, one or more indenters 139 concentrate the deformation force (not shown) on the flexible busbar (not shown) such that the flexible busbar deforms and conforms to reliefs 138.

First member 118 is illustrated having two reliefs 138, while second member 120 is illustrated having three reliefs 138. Preferably, reliefs 138 on first member 118 are offset by two indenters 139, along the first axis 124, with respect to reliefs 138 on second member 120. In this manner, connector 110 is configured to increase the pullout value and holding force on the flexible busbar (not shown) by adjacent reliefs 138. Stated another way, connector 110 is configured to prevent pinch points between adjacent reliefs 138 by ensuring a minimum offset therebetween.

Figure 10:
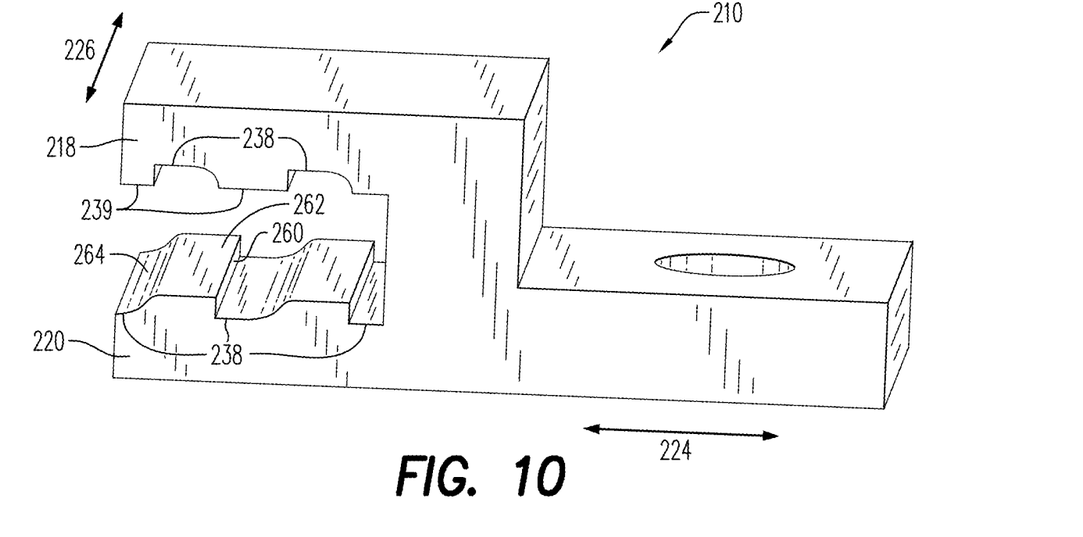

Connector 210 illustrated in FIG. 10, similar to connector 110 of FIG. 9, has one or more reliefs 238 on both first and second members 218, 220 and extending along second axis 226. First member 218 is illustrated having two reliefs 238 that are offset by indenters 239, along the first axis 224, with respect to the three reliefs 238 of second member 220 so as to increase the pullout value and holding force on the flexible busbar (not shown) by adjacent reliefs 238.

Instead of the rectangular cross section of FIG. 9, connector 210 has reliefs 238 with a cross section that results in upstanding features having a first surface 260, a second surface 262, and a third surface 264. First surface 260 is a vertical planar surface that runs along axis 226 and, thus, faces a direction opposite to the pullout forces on the flexible busbar (not shown) along first axis 224. Second surface 262 is a horizontal planar surface that also runs along second axis 226 and, thus, faces a direction towards first and second members 218, 220, respectively. Third surface 264 is an arcuate surface that provides a gentle slope away from second surface 262 towards first and second members 218, 220, respectively. In this manner, reliefs 238 have a cross section that provides the upstanding features with a waveline appearance.

Figure 11:
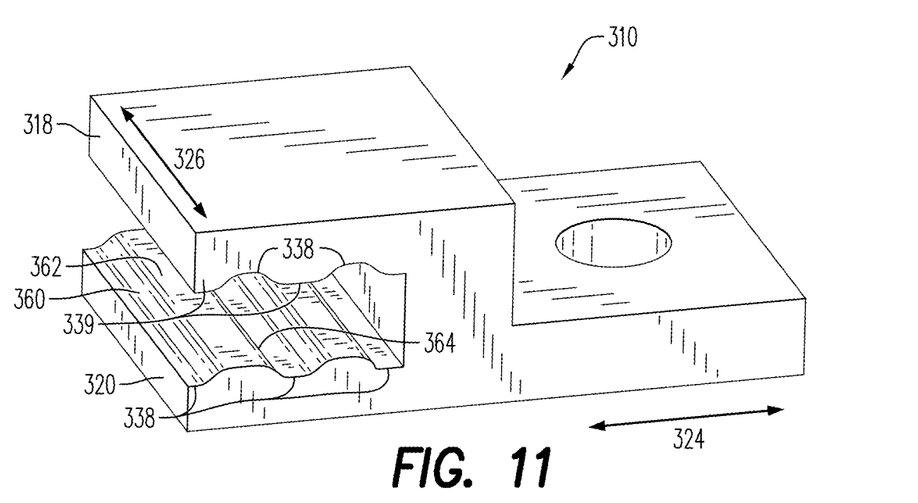

Connector 310 illustrated in FIG. 11 has one or more reliefs 338 on both first and second members 318, 320 and extending along second axis 326. First member 318 is illustrated having two reliefs 338 that are offset, along the first axis 324 by indenters 339, with respect to the three reliefs 338 of second member 320 so as to increase the pullout value and holding force on the flexible busbar (not shown) by adjacent reliefs 338.

Connector 310 has reliefs 338 with a cross section that results in upstanding features having a first surface 360, a second surface 362, and a third surface 364. First surface 360 is an arcuate surface that runs along second axis 326 that provides a gentle slope away from first and second members 318, 320, respectively, towards second surface 362. Second surface 362 is a horizontal planar surface that also runs along second axis 326 and, thus, faces a direction towards first and second members 318, 320, respectively. Third surface 364 is also an arcuate surface that provides a gentle slope away from second surface 362 towards first and second members 318, 320, respectively.

Figure 12:
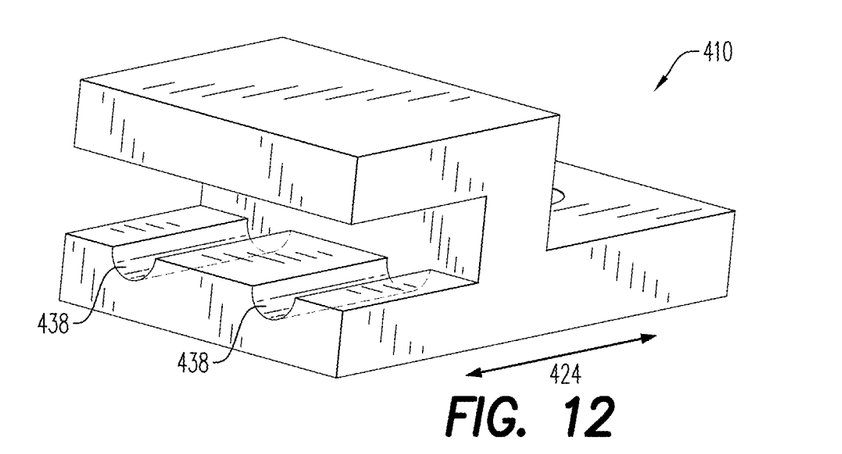

Connector 410 illustrated in FIG. 12 is substantially similar to the semi-circular concave cross sectional relief 38 of connector 10 shown in FIG. 1. However in the embodiment of FIG. 12, connector 410 is shown having reliefs 438 extending along first axis 424, namely perpendicular to the embodiment of FIG. 1.

Connector 510 illustrated in FIG. 13 is shown, for ease of explanation, lacking any reliefs. Namely, first and second members, 510, 520 in jaw 516 are flat. Here, connector 510 further includes one or more bores 566 through jaw 516. Bores 566, similar to bore 542, allows connector 510 to be secured with conventional fastening hardware to a circuit or other component. Optionally, bores 566 and 542 can be threaded, countersunk, and/or counter bored. In this manner, connector 510, after deformable compression of jaw 516 and deformation of the flexible busbar, can be used to terminate the busbar and pass electrical current from the flexible busbar to a desired mounting surface.

Connector 610 illustrated in FIG. 14, has one or more reliefs 638 on both first and second members 618, 620, both depending from support member 622. Between reliefs 638 in first member 618 is an indenter 639. Indenter 639 is vertically aligned with guides 640 of first member 618 and at least one of reliefs 638 of second member 620 along third axis 625. Reliefs 638 are concave surfaces formed in the inner opposing surfaces of first and second members 618 and 620 of jaw 616. Reliefs 638 are spaced apart along first axis 624 and extend along second axis 626. Reliefs 638 in first member 618 are offset with respect to reliefs 638 in second member 620 along first axis 624. Further guides 640 on an outer surface of first member 618 of jaw 616 are convex channels extending along axis 626. Connector 610 has a tongue 614 similar to that of connector 10.

Figure 15:
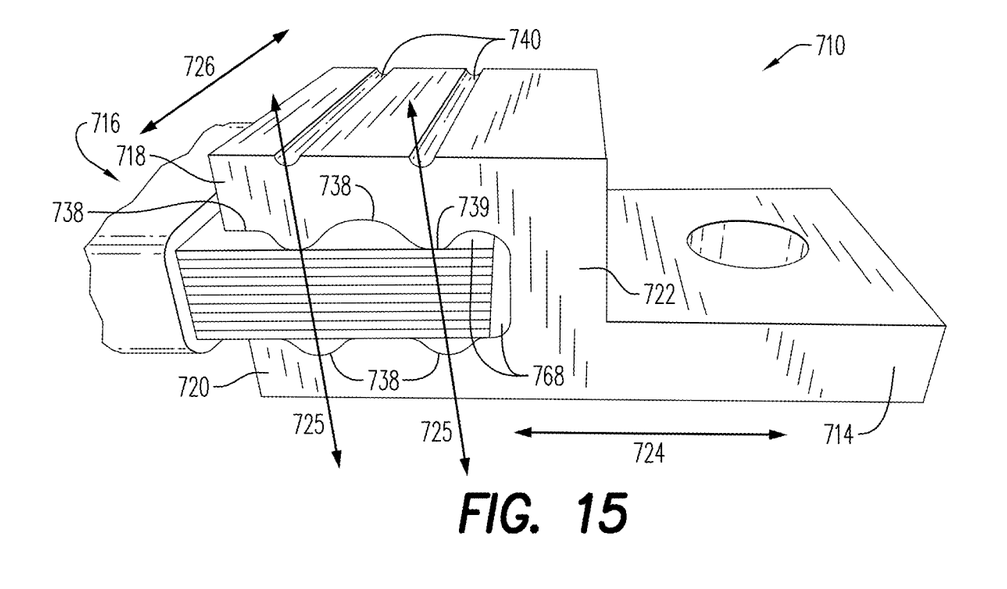

Connector 710 illustrated in FIG. 15, is similar to connector 610 but also has a feature 768 located at the intersection of support member 722 and each of first and second members 718, 720. Feature 768 is a radius extending along axis 726. Additionally, connector 710 has two indenters 739 vertically aligned with the two reliefs in second member 720 and two guides 740 in first member 718 along each third axis 725. Although shown in both first and second members 718, 720, feature 768 can also be located in only one of first and second members 718, 720. Connector 710 has one or more reliefs 738 on both first and second members 718, 720. Reliefs 738 are concave surfaces formed in the inner opposing surfaces of first and second members 718, 720 of jaw 716. Reliefs 738 are spaced apart along first axis 724 and extend along second axis 726. Reliefs 738 in first member 718 are offset with respect to reliefs 738 in second member 720 along first axis 724. Further guides 740 on an outer surface of first member 718 of jaw 716 are convex channels extending along axis 726. Connector 710 has a tongue 714 similar to that of connector 10.

It should be noted that where a numerical range is provided herein, unless otherwise explicitly stated, the range is intended to include any and all numerical ranges or points within the provided numerical range and including the endpoints.

It should also be noted that the terms "first", "second", "third", "upper", "lower", and the like may be used herein to modify various elements. These modifiers do not imply a spatial, sequential, or hierarchical order to the modified elements unless specifically stated.

Although described herein with reference to one or more exemplary embodiments, it will be understood by those skilled in the art that various changes may be made and equivalents may be substituted for elements thereof without departing from the scope of the present disclosure. In addition, many modifications may be made to adapt a particular situation, construction, operation, or material to the teachings of the disclosure without departing from the scope thereof. Therefore, it is intended that the present disclosure not be limited to the particular embodiment(s) disclosed as the best mode contemplated, but that the disclosure will include all embodiments falling within the spirt and scope of the appended claims.

What is claimed is:

1. A connector for a flexible busbar, comprising:
   an upper jaw member having an outer surface and an inner upper surface, the outer surface having a first guide and a second guide, the inner upper surface having a first indenter and a second indenter;
   a lower jaw member having an inner lower surface, the inner lower surface having a first relief and a second relief; and
   a support member having a planar inner surface, the upper and lower jaw members depending from opposite ends of the planar inner surface so that the inner upper and lower surfaces face and are spaced from one another along a compression axis by a distance larger than a thickness of the flexible busbar,
   wherein the first guide, the first indenter, and the first relief are aligned with one another along a first line on the compression axis and the second guide, the second indenter, and the second relief are aligned with one another along a second line on the compression axis.

2. The connector of claim 1, wherein the first and second guides are configured and positioned to receive an indenter die so that a deformation force applied by the indenter die to the first and second guides concentrates the deformation force on the flexible busbar at the first and second indenters and into the first and second reliefs, respectively.

3. The connector of claim 1, wherein the first and/or second reliefs is/are disposed at an intersection of the lower and/or upper jaw member and the planar inner surface so that the first and/or second relief function(s) as a weakened area for compression.

4. The connector of claim 1, further comprising a lug depending from the support member in a direction opposite the upper and lower jaw members.

5. The connector of claim 4, wherein the lug and the lower jaw member define a planar outer surface.

6. The connector of claim 4, wherein the upper jaw member, the lower jaw member, the support member and the lug are an extruded member.

7. The connector of claim 6, wherein the extruded member is made of a metal selected from a group consisting of steel, iron, aluminum, copper, silver, gold, and alloys thereof.

8. The connector of claim 1, wherein the upper jaw member, the lower jaw member, and the support member are an extruded member.

9. The connector of claim 8, wherein the extruded member is made of a metal selected from a group consisting of steel, iron, aluminum, copper, silver, gold, and alloys thereof.

10. A busbar assembly comprising:
    a flexible busbar comprising a plurality of electrically conducting layers stacked upon one another to provide a thickness;
    an upper jaw member having an outer surface and an inner upper surface, the outer surface having a first guide and a second guide, the inner upper surface having a first indenter and a second indenter;
    a lower jaw member having an inner lower surface, the inner lower surface having a first relief and a second relief;
    a support member having a planar inner surface, the upper and lower jaw members depending from opposite ends of the planar inner surface so that the inner upper and lower surfaces face and are spaced from one another along a compression axis by a distance larger than the thickness of the flexible busbar, wherein the first guide, the first indenter, and the first relief are aligned with one another along a first line on the compression axis and the second guide, the second indenter, and the second relief are aligned with one another along a second line on the compression axis, and wherein the upper and lower jaw members are deformably compressed onto the flexible busbar with the first and second indenters compressing different regions of the flexible busbar into the first and second reliefs, respectively.

11. The busbar assembly of claim 10, further comprising insulation disposed on at least a portion of the flexible busbar.

12. The busbar assembly of claim 10, further comprising a lug depending from the support member in a direction opposite the upper and lower jaw members.

13. The busbar assembly of claim 12, wherein the lug and the lower jaw member define a planar outer surface.

14. The busbar assembly of claim 12, wherein the upper jaw member, the lower jaw member, the support member and the lug are an extruded member.

15. The busbar assembly of claim 14, wherein the extruded member is made of a metal selected from a group consisting of steel, iron, aluminum, copper, silver, gold, and alloys thereof.

16. The busbar assembly claim 15, wherein the extruded member is made of a material that is harder than a material of the flexible busbar.

17. The busbar assembly of claim 10, wherein the upper jaw member, the lower jaw member, and the support member are an extruded member.

18. The connector of claim 17, wherein the extruded member is made of a metal selected from a group consisting of steel, iron, aluminum, copper, silver, gold, and alloys thereof.

19. The busbar assembly claim 17, wherein the extruded member is made of a material that is harder than a material of the flexible busbar.

* * * * *